United States Patent [19]

Kurzweil, Jr.

[11] Patent Number: 4,907,105
[45] Date of Patent: Mar. 6, 1990

[54] SYNCHRONIZED SPINDLE CONTROL FOR DISK DRIVES

[75] Inventor: Fred Kurzweil, Jr., Saratoga, Calif.

[73] Assignee: Maxtor Corporation, San Jose, Calif.

[21] Appl. No.: 166,857

[22] Filed: Mar. 11, 1988

[51] Int. Cl.$^4$ .................. G11B 15/46; G11B 17/00
[52] U.S. Cl. ........................... 360/73.02; 360/73.01
[58] Field of Search .............. 360/73.2, 73.01, 15, 360/71

[56] References Cited

U.S. PATENT DOCUMENTS

| | | | |
|---|---|---|---|
| 3,893,178 | 7/1975 | Sordello | 360/73.02 |
| 3,911,488 | 10/1975 | Wood et al. | 360/71 |
| 4,025,958 | 5/1977 | Orima et al. | 360/73.02 |
| 4,586,093 | 4/1986 | Fukuju et al. | 360/73.02 |

FOREIGN PATENT DOCUMENTS 84-00239  1/1984  PCT Int'l Appl. .................. 360/15

Primary Examiner—John H. Wolff
Attorney, Agent, or Firm—Hecker & Harriman

[57] ABSTRACT

The present invention provides a method and apparatus for linking together a plurality of disk drives. One drive is designated the "master". The others, designated "slaves", are synchronized to a common signal which may be from the "master" drive or from an external source. The disks are synchronized with respect to rate of revolution (spindle speed) and angular position. A plurality of hard disk drives are coupled in this manner to provide a parallel data output to a host computer. Each disk drive is microprocessor controlled. In normal operation a speed control loop regulates spindle speeds to within one percent of 3600 RPM. Both master and slave drives are equipped with input "MAPIN" and output "MAPOUT" signal terminals. The MAPOUT signal is relative to and dependant on the angular position of the disk. Synchronization is achieved by coupling the output signal from the master drive (MAPOUT) to the input terminal on the slave drives (MAPIN). The MAPOUT signals of each slave drive are compared with the master MAPOUT signal to provide a difference signal. This difference signal is used as an error correction signal to speed up or slow down the rotation of the slave drives until they are in synchronization (angular position and rotation speed) with the master drive. This is a highly precise control so to allow parallel data streams to be generated from the parallel drives at a high rate with a minimum of buffering requirements.

10 Claims, 5 Drawing Sheets

SYNCHRONIZED SPINDLE CONTROL FOR DISK DRIVES

BACKGROUND OF THE INVENTION

1. Field of the Invention

This invention relates to the field of disk drives and to a method of synchronizing a plurality of individual disk drives joined in parallel.

2. Background Art

Data intensive computer applications such as graphics applications, satellite data transmission applications, real time system applications, three dimensional rendering and military applications require the ability to transfer large amounts of data at high transfer rates. In the past, Winchester hard disk drives have been used to provide the storage and data transfer capabilities for computer systems applications. As data transfer requirements have risen, incremental changes and improvements in disk drive performance have been made to keep pace. For example, data and track density increases, media improvements and a greater number of heads and disks have resulted in higher data transfer rates. A disadvantage of such incremental improvements is the large research and development costs associated with each improvement. In addition, as the capacity of any single disk increases, the latency of the disk becomes a factor in performance. Latency is the average time it takes a read/write head to reach a desired data location on a particular track and is a function of the size of the disk rotation speed. The rotation rate of hard disk drives is standardized at 3600 RPM. Therefore, for a single disk, the latency is essentially a fixed value.

To improve bandwidth, it is necessary to divide the data transfer among a plurality of disks. The data is broken up into chunks that may be accessed simultaneously or consecutively from a number of drives. By linking a plurality of drives, a parallel stream of data may be achieved. This increases the band width of the data transfer for improved performance. In addition, the latency can be reduced by dividing a data stream among several drives. In the prior art, drives were linked in parallel and coupled to buffers as an intermediate mechanism to allow synchronization of the data for transfer to a processing means. However, because the data must be buffered prior to output, these prior art systems, are not suitable for "real time" applications.

Therefore, it is an object of the present invention to provide a method of synchronizing a plurality of disk drives.

It is another object of the present invention to provide a low cost method of achieving high data transfer rates utilizing a plurality of low cost Winchester disk drives.

It is yet another object of the present invention to provide a method of synchronizing the indexes of a plurality of disk drives.

It is yet another object of the present invention to provide a method of synchronizing a plurality of disk drives to a common index signal.

SUMMARY OF THE PRESENT INVENTION

The present invention provides a method and apparatus for linking together a plurality of disk drives and synchronizing the spindles of the drives to a common signal which may be from a "master" disk drive or from an external source. In a typical disk drive application, an information storage disk contains an "index" which defines and establishes a "start/stop" point for each information track on the storage disk. The index for each disk is located, for example, in a radial line on the storage disk as shown in FIG. 1. Other configurations of the index may be implemented as well. A plurality of hard disk drives are coupled together in parallel to provide a parallel data output to a host computer. In order to achieve efficient operation of the parallel disk drive system, the drives are synchronized to the indexes of a master drive or to an external index source. Each disk drive is microprocessor controlled, and, in normal operation, implements a speed control loop to regulate the spindle speed to within one percent of 3600 RPM. The output of the speed control loop is a "MAPOUT" signal which is relative to and dependant on this index position.

Each drive continuously monitors itself to detect a hard wire connection indicating that the disk is part of a parallel system. For synchronized operation, one disk drive is designated as the master drive and all others are designated as slave drives. The MAPOUT signal of the master drive is inputted to a MAPIN input on each slave drive. The MAPIN signal (generated by the master drive) is summed with the MAPOUT signal of each slave drive so that the indexes of each slave drive may be synchronized to the index of the master drive. Each MAPOUT signal is relative to the index position of the individual disk drive, and the MAPIN signal is relative to the index position of the master drive. Therefore, the differential of the signals represents the difference between the indexes of the master and slave drives. This difference signal is used as an error correction signal to speed up or slow down the rotation of the slave drives until their indexes are in synchronization with the index of the master drive. Utilizing the system of the present invention, synchronization of indexes to within plus or minus 20 microseconds may be achieved. This close tolerance allows parallel data streams to be generated from the parallel drives at a high rate with a minimum of buffering requirements.

DETAILED DESCRIPTION OF THE PRESENT INVENTION

Figure 1:
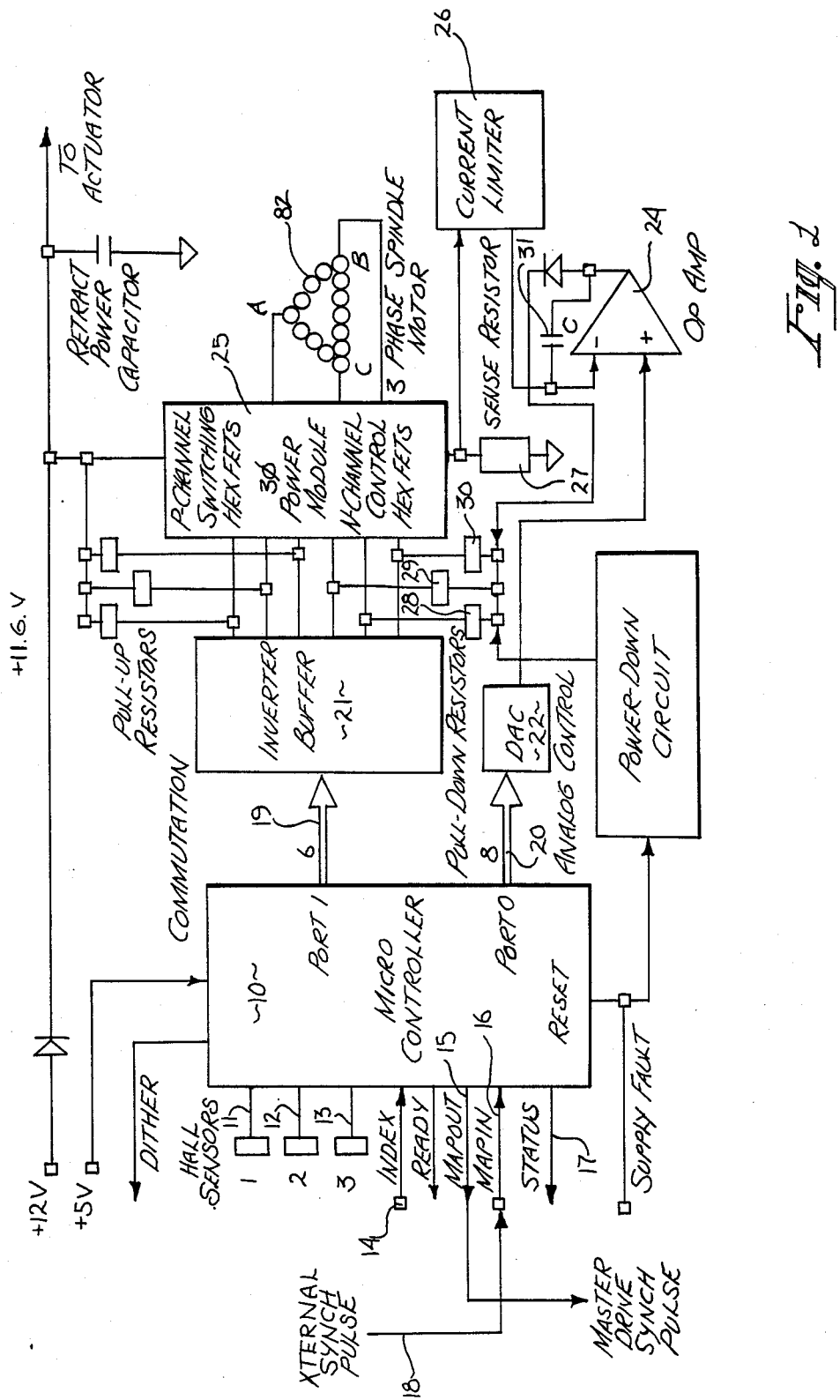
FIG. 1 is a block diagram illustrating the preferred embodiment of the present invention.

A method and apparatus for synchronizing a plurality of disk drives coupled in parallel is described. In the following description, numerous specific details are set forth in order to provide a more thorough description of the present invention. It will be obvious, however, to one skilled in the art, that the present invention may be practiced without these specific details. In other instances, well known features have not been described in detail in order not to unnecessarily obscure the present invention.

In the present invention, a plurality of disk drives are linked in parallel to provide a high speed data input stream to a host computer. Each disk drive is individually microprocessor controlled and, in normal operation, implements a speed control loop to regulate the spindle speed to within 4 RPM of 3600 RPM in the preferred embodiment. The output of this speed control loop is referred to as a "MAPOUT" signal which is relative to and dependant on disk drive index position. Each drive continuously monitors itself to detect a hard wire connection indicating that it is part of a parallel system. For synchronized operation, one disk drive is designated as the master drive and all others are designated as slave drives. The MAPOUT signal of the master drive becomes a MAPIN signal to each slave drive. The MAPIN signal (generated by the master drive) is summed with the MAPOUT signal of each slave drive so that the indexes of each slave drive may be synchronized to the index of the master drive. Since each MAPOUT signal is relative to the index position of the individual disk, and the MAPIN signal is relative to the index position of the master drive, the differential of the signals represents the difference between the indexes of the master and slave drives. This difference is used as an error correction signal to speed up or slow down the rotation of the slave drives until their indexes are in synchronization with the index of the master drive.

The synchronization permits parallel data streams to be generated from the parallel drives at a high rate with a minimum of buffering requirements. In operation, the micro-controller provides simultaneous functions for each drive. The micro-controller generates a master pulse out (MAPOUT) signal and searches for a master pulse in (MAPIN) signal. Normal load operation implies the lack of a MAPIN pulse and while in this mode, the drive defaults to a master drive designation. The MAPIN pulse is detected in the preferred embodiment through a hard wire connection. When the MAPIN pulse is detected, the particular drive is posted as a slave drive and enters a high speed capture mode to bring the MAPIN pulse within a desired window. Normal velocity control is in effect during this operation. As the MAPIN error signal approaches the map window, a velocity adjustment is made to the slave drive to return the drive to normal velocity prior to entering the map window and subsequent phase lock window. Once within the desired window, the bounds are tested for velocity error and phase error (MAPERR). If the two are within their tolerance zones, the system switches to a phase controlled configuration, where the slave drive is locked to the MAPIN pulse and synchronous spindle operation is achieved. If the velocity error and phase error exceed the boundaries, the slave drive reverts to the capture mode to regain the tolerances.

An additional feature of the present invention is a unique architecture of the control system which provides robust control over all of the multi-functional requirements of the synchronized spindle operation. This is achieved by the use of the first order velocity control loop in which the long term steady state velocity error (due to external variable drag/bearing forces) is cancelled out by a compensating torque current adaptably generated by the micro-controller which tracks the velocity error. Robustness of the control is achieved by the ability of the first order velocity control to operate over a wide range of parameter tolerances and its ability to recover after exceeding the tolerances or having lost control. The system of the present invention is a sampled data system operating at one sample per revolution in the preferred embodiment of the present invention.

Figure 5:
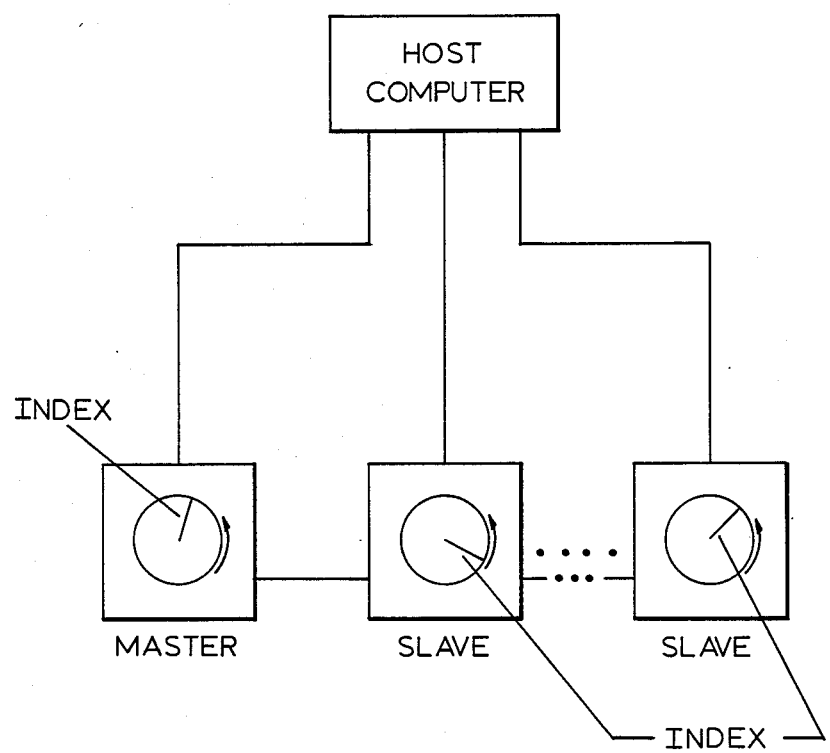
FIG. 5 depicts a block diagram of a typical disk drive.

In a typical disk drive application, as illustrated in FIG. 5, a rotating information storage disk 101 includes an "index" 102 which defines and establishes a "start/stop" point for each information track on the storage disk. The index may be thought of as extending in a radial line on each storage disk, although the index may be staggered for each information track. To provide a high speed parallel data output from a plurality of interconnected disk drives, it is necessary for the indexes to be synchronized, i.e. each passing the read/write heads at the same time. It is also necessary for the individual disk drives to be speed controlled so that each drive has a constant rotation rate, which, in the preferred embodiment, is 3600 rpm.

The present invention provides for the detection of the index on a master disk drive and the generation of a first output signal upon detection. This first output signal is representative of the angular position of the index of the master drive. Each slave drive also generates an output signal upon detection of its own index. At each slave drive, the first output signal is compared to the slave output signal to generate a difference signal representative of the difference in angular position between the index of the master drive and each slave drive. This difference signal is used to control the current to the motor of the slave drives to speed them up or slow them down to synchronize the angular position of the indexes to the master drive index.

Referring to FIG. 1, a block diagram illustrating the preferred embodiment of the present invention is illustrated. As noted previously, the spindle control is implemented by a micro-controller which is part of the electronic control hard wire of a disk drive motor assembly. The micro-controller 10 communicates with the Hall sensors through inputs 11-13. An index signal on a storage disk is detected by read/write heads and inputted to the micro-controller on input 14. In the default mode of the preferred embodiment of the present invention, each micro-controller 10 acts as a master controller and outputs a MAPOUT signal 15. Each micro-controller 10 also looks for an external sync pulse signal 18 on a hard wire MAPIN input 16. When the MAPIN input is detected, the micro-controller becomes a slave controller. The controller 10 outputs a status signal on output 17.

The micro-controller 10 coordinates, directs and controls all of the activity of the spindle of the disk drive motor. The micro-controller 10 monitors the Hall sensor inputs 11-13 and commutates the three phase spindle motor 82 by providing control signals 19 at output port 1 through inverter buffer 21 and three phase power module 25. Current through the motor 82 is monitored by monitoring the voltage across sense resistor 27. The current output of power module 25 is coupled to current limiter 26 and compared to the output of digital to analog converter 22 at operational amplifier 24. The control loop is closed through the power transistors 28-30 coupled to the output of inverter buffer 21. An integrating capacitor 31 coupled between the output and inverting input of operational amplifier 24 stabilizes the loop. The use of the micro-controller implements a partitioning of power component from signal components to provide greater flexibility in space and power configurations. The micro-controller 10 is also used to calibrate the motor constant and compute the spindle drag force on start up. The drag force is then monitored and updated and updated to track variation and bearing drag force and to allow close control on velocity error.

Figure 2:
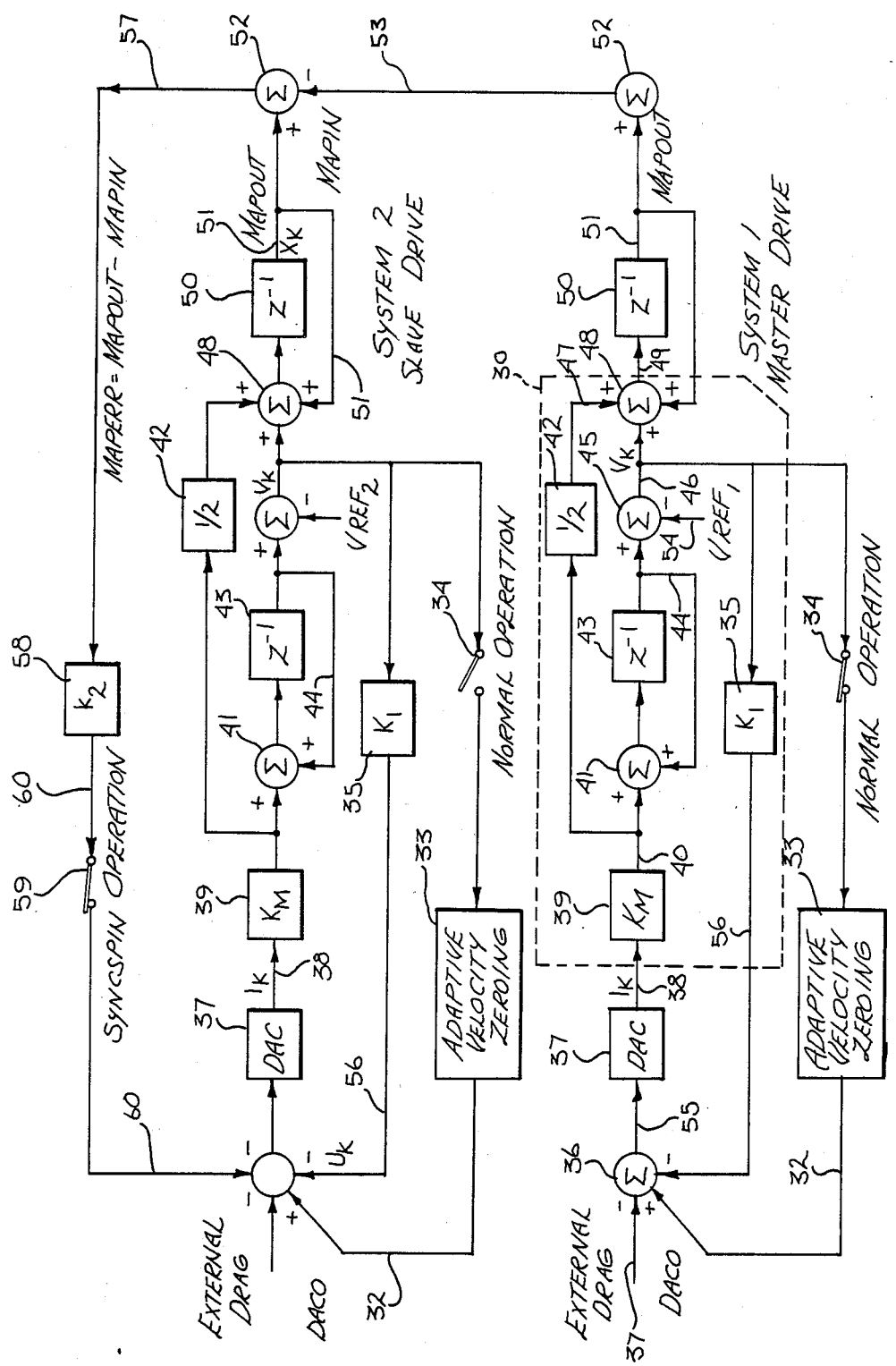
FIG. 2 is a schematic illustrating a sampled model of the motor of a slave drive and a master drive.

A sampled model of a master drive motor and a slave drive motor is illustrated in FIG. 2. As noted previously, the system is a sampled data system operating at one sample per revolution of the preferred embodiment. However, any other sample rate may be utilized without departing from the scope of the present invention. Velocity error per revolution is $V_k$ and phase error per revolution is $X_k$. A simple first order velocity control loop is the basis of the architecture of the present invention. The control loop is used for normal operation, for moving from one reference velocity to another such as in calibration and capture, for all lock on tasks and for all recovery operations. In the normal mode, small errors and velocity introduced by variations in the average drag force are cancelled by slow integration of the velocity error. $V_k$ is isolated from any offsets caused by external forces. The micro-controller algorithm is:

$$U_k = -(k_1 \times v_k)/K_s$$

where:
$k_1$ = Velocity fb coefficient
$k_s = DAC \times K_m$
$DAC0 = -DRAG$
$V(s)/I(s) = (K_m)/s$.

Still referring to FIG. 2, a sampled model of the master motor is contained within dashed line 30 and encompasses the area from $I_k$ (motor current) to $X_k$ (position). Initial values of $K_m$ and DAC0 are determined by an adaptive computation upon entering the normal mode. Thus, the velocity loop in the normal mode runs free of DC velocity error while also providing a fast response to error disturbances. The velocity loop is also used to drive the MAPIN pulse into coincidence with the MAPOUT pulse during synchronized operation.

It is understood that in the preferred embodiment of the present invention, a single drive is designated as the master drive or one or more connected drives are considered to be slave drives. Referring to the master motor configuration, external drag error signal 31 is inputted to summing node 36 along with DAC0 32, which is a compensation signal equal and opposite to the external drag force 31. DAC0 32 is generated by slow integration of the velocity error signal. The output 55 of the summing node 36 is inputted to digital to analog converter 37 which outputs signal $I_k$ 38 representing the drive current of the master disk drive.

The drive current 38 is multiplied by a motor constant $K_m$ 39 which is a current to velocity conversion factor. The output 40 of $K_m$ block 39 is coupled to a summing node 41 into a coefficient block 42. In the preferred embodiment, the coefficient has a value of ½ to compensate for the double integration from current to position. The output 47 of coefficient block 42 is coupled to summing node 48.

The output of summing node 41 is coupled through delay 43 in a feedback loop 44 to summing node 41. The output of delay 43 is also coupled to summing node 45 along with a velocity reference 54. The output 46 of summing node 45 represents the velocity error $V_k$ between the desired velocity and the actual velocity of the master drive. This velocity error $V_k$ is coupled to summing node 48. The velocity error is combined with the velocity signal 47. The output 49 of summing node 48 is coupled to delay 50. The output 51 of delay 50 is coupled in a feedback loop to summing node 48. The output 51 is a position signal and represents the index of the master drive and is accordingly used as the MAPOUT signal of the master drive. This MAPOUT signal is coupled to summing node 52. Summing node 52 outputs a signal 53 which becomes a MAPIN signal to the control loop of a slave drive.

Still referring to the master motor configuration, the velocity error signal $V_k$ is coupled to $K_1$ 35 which is a velocity code. The output 56 of $K_1$ block 35 is coupled to summing node 36. In the preferred embodiment, external drag 31 is cancelled out by DAC0 signal 32 so that signal 56 acts as a control of the velocity loop of the master drive.

The velocity error $V_k$ is also coupled through switch 34 to adaptive velocity zeroing block 33. Adaptive velocity zeroing block 33 is a relatively slow moving integration function used to increment or decrement DAC0 32 over time. A number of samples of $V_k$ are accumulated and averaged out over a long term to offset the slow variations introduced by the external drag 31.

The slave drive loop is substantially identical to the master loop 30 and like elements have been numbered with like numerals where applicable. The MAPOUT signal 51S of the slave loop is combined with a MAPIN signal 53 from the master loop and summing node 52S. The output 57 of summing node 52S is a MAPERR signal representing the error between the indexes of the master and slave drives. This MAPERR signal is multiplied by a constant $K_2$ at $K_2$ block 58. The output 60 of $K_2$ block 58 is coupled through switch 59 to summing node 36 of the slave loop. The velocity of the slave loop is controlled by its own velocity error signal $V_k$ and its index position is controlled by the MAPERR signal 57.

Figure 3:
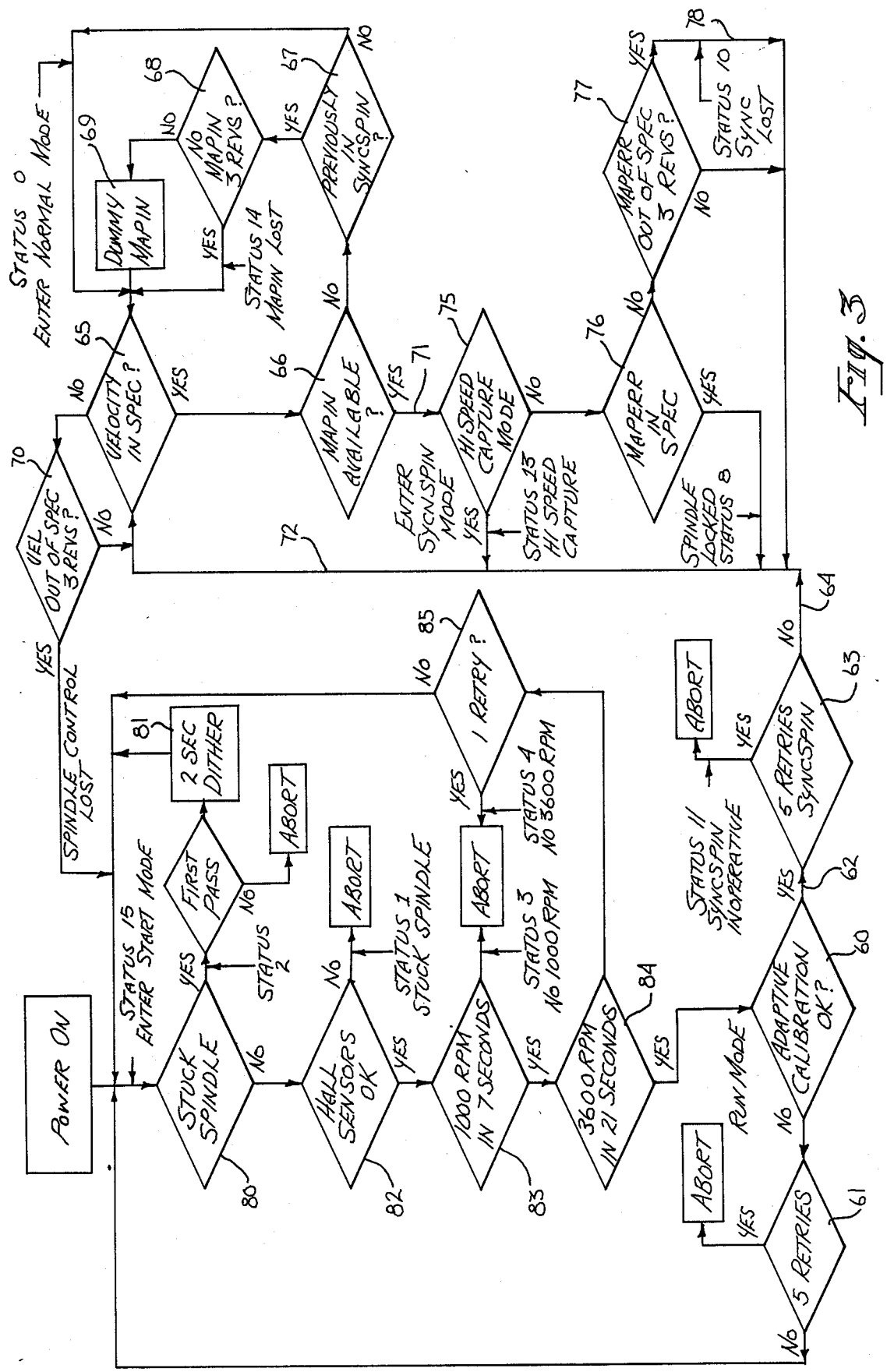
FIG. 3 is a flow chart illustrating the operation of a disk drive utilizing the present invention.

A flow chart illustrating the operation of the present invention is illustrated in FIG. 3. At power up, full current is applied to the spindle motor. Progressive diagnostic and timing checks are performed to detect spindle drive malfunction and to take corrective action as necessary. Initially, at decision block 80, the Hall sensors are tested for commutation motion. If one second elapses in the preferred embodiment without motion, a two second dither at block 81 is implemented to free up the spindle. The Hall sensors are again monitored and if motion is not detected, the disk drive powers down. If motion is detected, the disk drive continuously monitors the Hall sensors to determine if an illegal state occurs. If there is a Hall sensor failure for two consecutive revolutions, the disk drive powers down.

The next check occurs after seven seconds at decision block 83 to determine if the disk drive has reached a minimum RPM of 1000. If this rotation rate is not obtained, the disk drive powers down.

If the disk drive meets this revolution perimeter, another check in 21 seconds at decision block 84 checks to see if the disk drive has achieved 3600 RPM. If no, the system makes one re-try attempt before aborting.

After start up, the disk drive enters run mode. Starting at input 60, the disk drive checks to determine if the adaptive calibration performed by the disk drive has been successful. This adaptive calibration provides a compensating factor for bearing wear, aging and changing drag coefficients. If the adaptive calibration is not successful, the disk drive returns to start mode and begins again. After five unsuccessful attempts at adaptive calibration, the start up mode is aborted.

If adaptive calibration is successful, the disk drive continues on path 62 to decision block 63. Since the initial assumption is that the disk drive is in normal operation, if the drive indicates sync spin mode on five consecutive samples, the disk drive aborts run mode. If the sync spin test is negative, the disk drive follows path 64 to decision block 65. At decision block 65, the disk drive checks to see if the velocity is within specifications. If the velocity is within specifications, the microcontroller next looks at decision block 66 to determine if a MAPIN signal is available. If a MAPIN signal is available, the disk drive enters sync spin mode. If MAPIN is not available, the disk drive checks to see if it was previously in sync spin at decision block 67. If the disk drive had not previously been in sync spin, the disk drive continues in normal operation, continuously checking to see if the velocity is within specification.

If the disk drive had previously been in sync spin, it looks for a MAPIN signal for three revolutions at decision block 68. If a MAPIN signal is obtained within three revolutions, a disk drive continues to check velocity and for MAPIN signals. If no MAPIN signal is detected within three revolutions, the disk drive provides a dummy MAPIN signal 69 until the genuine MAPIN signal can be recovered.

If the velocity check at block 65 is unsuccessful, the disk drive continues to decision block 70 to determine if the velocity remains out of spec for three consecutive resolutions. If the velocity remains out of spec, the disk drive returns to start mode. If the velocity is within spec within three revolutions, the disk drive returns to normal operation.

Figure 4:
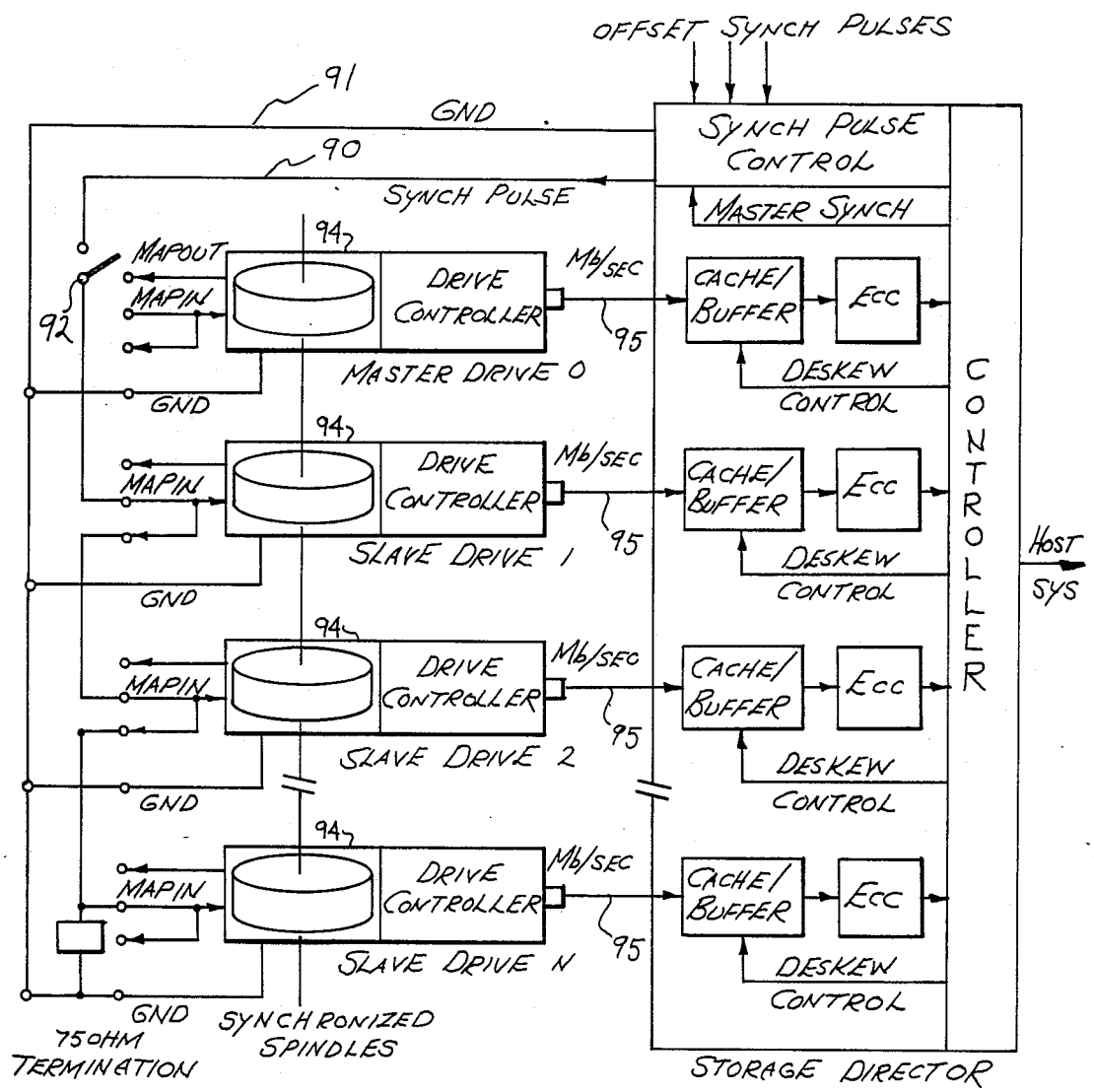
FIG. 4 is a block diagram illustrating a network of disk drives utilizing the present invention.

Many of the decisions made in sync spin mode are identical to that in normal run mode and are given like numbers in FIG. 4. Sync spin mode begins at path 71 and enters decision block 75. The first decision is whether the disk drive is in the high speed capture mode. If yes, the disk drive enters loop 72 where it continuously checks the velocity at block 65 and the availability of the MAPIN signal of block 66. If the disk drive is not in a high speed capture mode, the disk drive proceeds to decision block 76 to determine if the MAPERR signal is within acceptable specifications. If the answer is yes, the disk drive assumes that the spindle is locked (synchronized) with the master drive. If the MAPERR signal is not in in specification, the disk drive checks at decision block 77 to see if it is recovered within three revolutions. If the MAPERR signal is out of spec for three consecutive revolutions, the disk drive enters the high speed capture mode. If the MAPERR signal is recovered within specifications within three revolutions, the disk drive remains in tracking mode.

Referring now to FIG. 4, a block diagram of a plurality of disk drives joined in parallel utilizing the present invention is illustrated. A plurality of disk drives 94 are coupled in parallel to each other and have their outputs coupled to a host controller. The MAPIN input of slave drives 0-n are coupled to switch 92. Switch 92 is selectably coupled to a synch pulse from the host controller or to the MAPOUT signal of master drive 0. If an external synch pulse is utilized, it should be within the desired rpm tolerances of the disk drives in question and act as an index when the one sample per revolution sampling rate is utilized. The outputs 95 of the disk drives 0-n are coupled in parallel to the host controller, with each output coupled to a small cache buffer. In the preferred embodiment, where the index of the slave drives may be locked to within 20 microseconds of the index of the master drive, a small buffer may be utilized. This small size buffer is used for more precise data synchronization and permits high speed "real time" data transfer applications not possible with prior art systems.

The output of each buffer 95 is coupled to ECC 96 for eventual transfer to a host system.

I claim:

1. A method of synchronizing rotation of a first spindle of a first disk drive to a second spindle of a second disk drive, comprising the steps of:

providing a first index on a disk of said first disk drive;

detecting said first index and generating a first output signal, said first output signal being relative to the position of said first index;

providing a second index on a disk of said second disk drive;

detecting said second index and generating a second output signal, said second output signal being relative to the position of said second index;

coupling said first output signal to said second disk drive;

combining said first and second output signals to generate an error signal representative of the difference between the position of said first index and the position of said second index;

adjusting the rotation speed of said second spindle in relation to said error signal to synchronize said first and second disk drive.

2. The method of claim 1 further including the step of coupling said first output signal to a plurality of disk drives and synchronizing said plurality of disk drives to said first disk drive.

3. The method of claim 1 wherein said error signal is utilized to adjust current to a motor rotating said spindle of said second disk drive.

4. The method of claim 1 wherein said first and second output signals are compared to first and second reference signals respectively to generate first and second velocity error signals for controlling the velocity of said first and second disk drives respectively.

5. Apparatus for controlling the angular position of a first index on a rotating disk of a first disk drive with respect to a second index on a rotating disk of a second disk drive comprising:

first detecting means for detecting each revolution of said first index, said first detecting means outputting a first output signal in response to said detection of said first index signal;

first comparing means coupled to said first output signal for comparing said first output signal to a first reference signal, said first comparing means providing a first error signal representing a difference between said first output signal and said first reference signal;

first feedback means coupled to said first error signal and to a motor rotating said first disk for controlling the rotation speed of said motor;

second detecting means for detecting each revolution of said second index, said second detecting means outputting a second output signal in response to said detection of said second index signal;

second comparing means coupled to said second output signal for comparing said second output signal to a second reference signal, said second comparing means providing a second error signal representing a difference between said second output signal and said second reference signal;

second feedback means coupled to said second error signal and to a motor rotating said second disk for controlling the rotation speed of said motor;

third comparing means coupled to said first and second output signals for comparing said first and second output signals and providing a third error signal representing a difference between said first and second output signals;

third feedback means coupled to said third error signal and to said motor of said second disk drive for controlling position of said second index with respect to said first index.

6. The apparatus of claim 5 wherein said first detecting means comprises a microcontroller coupled to Hall sensors of said motor.

7. The apparatus of claim 5 wherein said first comparing means comprises a summing node.

8. The apparatus of claim 5 wherein said first feedback means includes converting means for converting said first error signal to a current for driving said motor.

9. A method for synchronizing a plurality of disk drives comprising the steps of:

designating one of said plurality of disk drives as a master drive;

providing a first output signal from said master dirve representative of the angular position of a rotating disk on said master drive;

designating the other of said plurality of disk drives as slave drives;

providing an output signal from each of said slave drives representative of the angular position of a rotating disk on each of said slave drives;

generating for each or said slave drives a first error signal representing a difference between said first output signal and said output signal of each said slave drive by comparing said first output signal to said output signal of each of said slave drives;

controlling the rotation of said slave drives in relation to said first error signal such that the angular position of said slave drives is dependent on said first output signal.

10. The method of claim 9 wherein said first error signal is coupled to a motor controlling the rotation of said slave drives for increasing and decreasing the rotation of said disks of said slave drives in relation to said first error signal.

* * * * *